F. E. NEARING,
Assignor to C. La Dow.
Horse Rake and Hay Spreader.
No. 9,540. Reissued Jan. 25, 1881.
*Fig. 1,*
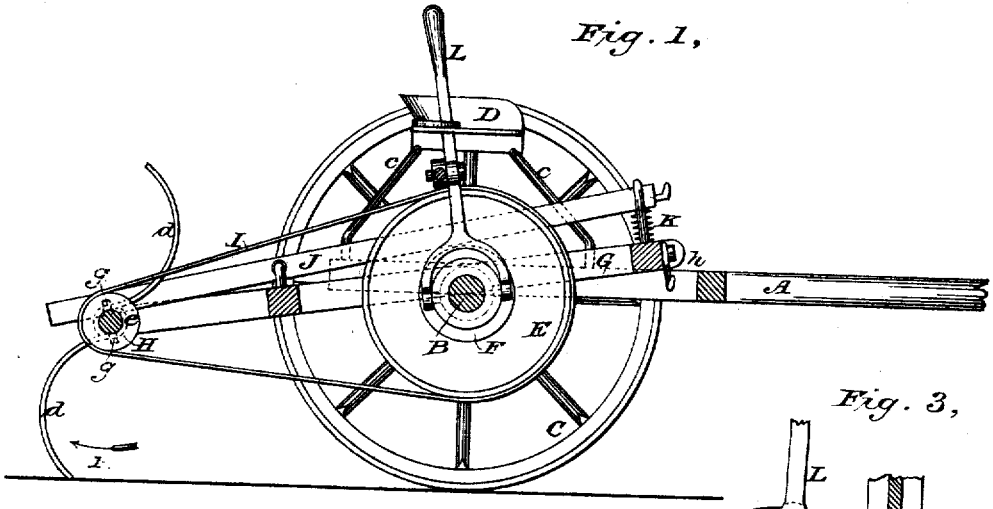
*Fig. 3,*
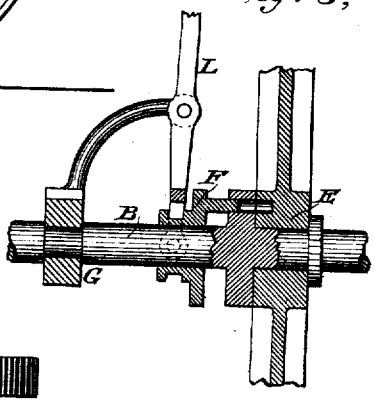
*Fig. 2,*
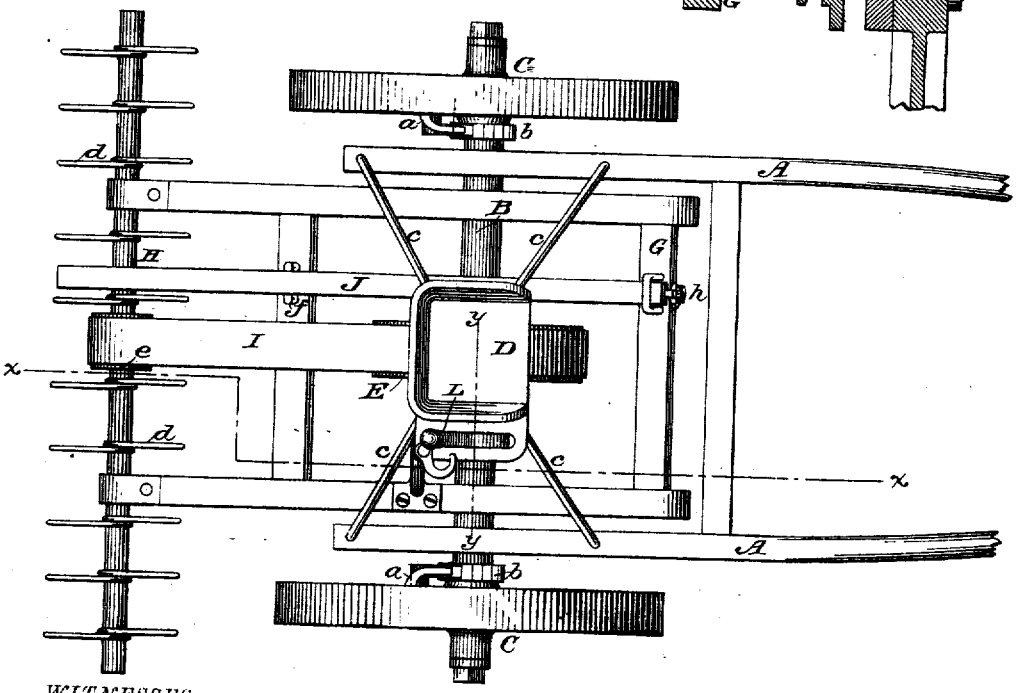
*WITNESSES*
Wm. A. Skinkle.
Geo. W. Breck.
*INVENTOR*
Frederick E. Nearing
by Baldwin, Hopkins, & Peyton
Attys for Assignee
N. PETERS, PHOTO-LITHOGRAPHER, WASHINGTON, D. C.

UNITED STATES PATENT OFFICE.

FREDERICK E. NEARING, OF BROOKFIELD, CONNECTICUT, ASSIGNOR TO CHARLES LA DOW, OF ALBANY, NEW YORK.

HORSE-RAKE AND HAY-SPREADER.

SPECIFICATION forming part of Reissued Letters Patent No. 9,540, dated January 25, 1881.

Original No. 73,192, dated January 7, 1868. Application for reissue filed December 6, 1880.

DIVISION A.

*To all whom it may concern:*

Be it known that I, FREDERICK E. NEARING, of Brookfield, in the county of Fairfield and State of Connecticut, have invented a new and Improved Combined Horse-Rake and Tedder; and I do hereby declare that the following is a full, clear, and exact description thereof, which will enable those skilled in the art to make and use the same, reference being made to the accompanying drawings, forming a part of this specification.

Figure 1 is a side sectional view taken in the line *x x*, Fig. 2. Fig. 2 is a plan or top view of the same. Fig. 3 is a section of a portion of the same, taken in the line *y y*, Fig. 2.

Similar letters of reference indicate corresponding parts.

This invention relates to a new and improved combination of a horse-rake and tedder; and it consists of a peculiar construction and arrangement of parts, as hereinafter fully shown and described, whereby the device may, by a very simple manipulation, be readily converted from a rake into a tedder, and vice versa, and rendered capable of operating in either capacity equally as well as if made specially for either purpose: first, in combining with an oscillating continuously rigid rake-head mounted upon a revolving axle by bearings attached to one side of the head, and a rotating lifting-wheel arranged on the axle between the carriage-wheels, a locking-pawl, dog, or pin capable of engaging, at the will of the operator, with the lifting devices, whereby the rake-head and lifting-wheel are locked together during the forward movement of the rake in the act of dumping the hay; secondly, in a continuously rigid oscillating rake-head mounted upon a rotating axle as its center of oscillation, and having bearings projecting from one side of the head, through which the axle rotates when the rake is advancing; thirdly, in a continuously rigid oscillating rake-head mounted by projecting armed bearings on a rotating axle as its center of oscillation, in combination with a rotating lifting-wheel and devices connecting the rake-head to the lifting-wheel for the purpose of raising the teeth and discharging the hay when the rake is advancing; fourthly, in continuously rotating an axle and lifting-wheel thereon by power applied from both wheels when the rake is advancing, and mounting a rake-head on the axle as its center of oscillation, the advantages of said organization being that the axle is not rotated when the driving-wheels are backed, the head and teeth are raised without torsion and at the same speed and from the same center as the driving-wheels revolve, and the lifting-wheel acts more quickly to raise the teeth (as the torsion of the axles is less) than in rakes whose axles are driven from one end only; fifthly, to so mount an oscillating rake head and teeth on a revolving axle that the teeth may have an independent motion up and down to follow uneven surfaces, and yet at all times maintain a uniform position relative to the rotated lifting devices on the axle.

In the accompanying drawings, A A represent thills, the rear parts of which are secured to an axle, B, having a wheel, C, on each end of it, the axle being allowed to turn freely in boxes or bearings at the under sides of the thills. The wheels C C are fitted loosely on the axle B, but are connected to it, when the device is drawn forward, by means of pawls *a* on the wheels engaging with ratchets *b* on the axle, the pawls slipping over the ratchets when the device is backed.

The driver's seat D is supported by rods *c* from the thills A A, and on the axle B there is fitted loosely a pulley, E, which may be connected therewith, when desired, by a clutch, F.

G is a rectangular frame, which is fitted loosely on the axle B, so as to work freely thereon. This frame projects considerably to the rear of the axle B, and has an ordinary revolving rake, H, fitted to its rear end. This rake may be provided with wire teeth *d*, curved in the usual way, and said rake, when used to tedder or scatter hay, is rotated continually from the axle B by means of a belt, I, the latter passing around a pulley, *e*, on the rake-head and around the pulley E on the axle, the pulley being connected with the axle by means of the clutch F. When the rake H is thus rotated it turns in the direction indicated by arrow 1, the convex sides of the teeth *d* acting upon the hay, so that the latter will not be carried around with the rake, but be thrown upward and outward behind it.

When the device is used as a horse-rake the pulley E is disconnected from the axle B, the clutch F being thrown out from the pulley, and the rake H consequently will not be rotated under the draft movement of the machine. The rake is, in this adaptation of the device, prevented from rotating casually by means of a lever-bar, J, balanced on the frame G and resting on a fulcrum, *f*, the rear part of said bar having a notch made in it for spurs *g g* on the rake-head to alternately catch against. Under the front end of the lever-bar J there is a spiral spring, K, which has a tendency to keep the rear end down upon the rake-head.

When the device is used as a tedder the rear end of the lever-bar is kept above and free from the rake-head by having the front end of the former depressed or forced down, and kept in that position by a hook, *h;* and when the device is to be used for raking the hook *h* is disengaged from the front end of the lever-bar, and the spring K forces up said end and forces down the rear end upon the rake-head.

When the lower teeth of the rake have gathered up a load, the driver, with his foot, presses down the front end of the lever-bar J, thereby raising the rear end of the latter and freeing the rake-head, so that the rake may make a half-revolution and discharge its load, the upper teeth, *d*, when turned down to working position, being stopped and retained by the spur *g*, which was previously at the under side of the rake-head, catching against the notch of the lever-bar J.

By allowing the foot-lever J to remain in its normal position when the machine is to be used as a rake said lever performs the function hereinbefore described—*i. e.*, preventing the head from rotating and throwing the clutch F into gear with the wheel E. Said wheel is locked to the revolving lifting-wheel on the axle, and the frame G, with its head H and teeth *d*, will oscillate partially around the axle B to discharge the gathered load.

When the clutch F is removed from the wheel E the teeth fall by reason of their own gravity, and resume a working position. The clutch F is shifted by a lever, L, which extends up at one side of the driver's seat D.

It will be seen that in this adaptation of the devices the head H is moved in such manner that its center of oscillation coincides with the center of rotation of the axle, whereby those parts of the dumping mechanism that are connected respectively to the axle and rake-head are not displaced or thrown out of their proper relative position by the oscillation of the head or rotation of the axle.

It will also be seen that the teeth are attached to the head in such manner as to avoid contact with the revolving axle and wear of their fastenings.

It will also be seen that the oscillating rake-head is supported from the revolving axle by two arms, which have journal-bearings directly thereon. These bearings reduce the friction and wear incident to rakes which have their teeth or their heads attached around a revolving axle.

It will be observed that the connection from the rake-head to the lifting-wheel, at the will of the operator, to dump the hay is effected by a directly-connecting belt having a support upon the rake-head, and therefore moving therewith at all times, and connecting to the lifting-wheel, when engagement is made, as hereinbefore described.

As the oscillation of the rake-head is centered on the axle and the connecting device is supported on the rake-head, it follows that the connecting device and the lifting-wheel will, when locked together, rotate forward on the same center, and therefore keep in engagement with each other.

By making the rake-head rigid from end to end and bringing the center of rotation of the lifting-wheel to substantially coincide with the center of oscillation of the rake-head, the lifting-wheel and rake-head are enabled to be thus locked together during all stages of the movement for discharging the hay, and the necessity for the complicated and cumbersome connecting devices heretofore used in revolving-axle hay-rakes is avoided, the weight and cost of the rake reduced, the whole construction simplified, and its practical operation greatly improved. The connection of the rake-head and lifting-wheel, with their movement upon practically the same center, also greatly reduces the power required for lifting the teeth to dump the gathered hay.

By rotating the axle by power applied from both wheels and making it the center of oscillation of the rake-head the head and teeth are promptly raised at a uniform speed without loss of motion or torsion of the axle and rake-frame.

I am aware that heretofore rake-teeth have been attached directly to an oscillating axle, which thereby became an oscillating rake-head.

I am also aware that rake-teeth have been attached directly to an intermittently-rotating axle, which carried them entirely around with it.

I am also aware that an oscillating rake-head, or a rigid frame which is the equivalent thereof, has been mounted directly upon a non-revolving axle as its center of oscillation, as shown in the patent of D. B. Woodward, dated February 19, 1861.

I am also aware that rake-teeth have been strung loosely upon a revolving axle with their ends extending in front thereof, and have been combined with a yoke or bar resting upon their front extremities, by depressing which they could all be raised to dump the hay, and with another yoke or bar resting upon them back of the axle, by depressing which they could all be held down to their work, and with another bar beneath them to support them in proper raking position, as shown in the patent of H. W. Sabin, dated December 3, 1850.

I am also aware that rakes have been made having an oscillating rake-head and a revolving axle, but arranged with the center of oscillation so far from the center of rotation as to require the intervention of a flexible connection of considerable length, and composed of several connected parts, as shown in the patents of G. Pierce, dated November 29, 1859, and J. H. Shireman, dated respectively September 9, 1862, and October 8, 1867.

I am also aware that rakes have been made with a revolving axle, a backing-ratchet in each driving-wheel, and a rake-head oscillating on pivots in rear of the axle, as shown in patents of George N. Palmer, dated respectively December 12, 1865, and May 28, 1867.

I am also aware that it is not new in harvesting machinery to employ two driving-wheels both of which are applied to their axle by pawls and ratchets, and therefore I do not claim such contrivances in their broadest sense.

My invention is limited to a rake in which the teeth are not attached directly to the axle, but to a rake-head intervening between them and the axle. It is further limited to a rake in which the rake-head is a continuously rigid structure, so that the power which raises them, the power which holds them down to their work, and the power which controls their raking position are all transmitted to them through one and the same structure, which I term the "rake-head," in contradistinction to the construction shown in the Sabin patent, in which such power is transmitted through several different and independent devices. It is further limited to a rake in which the center of oscillation of the rake-head structure and the center of rotation of the axle are so coincident that the rake-head and lifting-wheel can be locked together without danger of disengaging by the movements of the parts in dumping, and without requiring an unnecessary amount of power to raise the teeth.

I claim as my invention—

1. In a horse hay-rake, the combination of a rigid oscillating rake-head mounted upon a revolving axle by bearings fixed to one side of the head, a rotating lifting-wheel arranged on the axle between the carriage-wheels, and a locking pawl or dog capable of engaging, at the will of the operator, directly with the lifting devices, whereby the rake-head and lifting-wheel are locked together during the forward movement of the rake in the act of dumping without danger of disengagement by their movement, substantially as described.

2. In a horse hay-rake, a rigid oscillating rake-head mounted by projecting armed bearings upon a rotating axle as its center of oscillation, substantially as described.

3. The combination of a rigid oscillating rake-head mounted by projecting armed bearings on a rotating axle as its center of oscillation, a rotating lifting-wheel, a device connecting the rake-head to the lifting-wheel for the purpose of raising the teeth and discharging the hay when the rake is advancing, and lever mechanism whereby the operation of the devices may be controlled, substantially as described.

4. In a horse hay-rake, a lifting-wheel continuously rotated by power applied from both wheels when the machine is advancing, in combination with a rigid rake-head oscillating on a revolving axle as its center of motion, substantially as described, whereby the rake-head is raised at a uniform speed without torsional strain, as set forth.

5. In a horse hay-rake, the combination of an independent rigid rake-head mounted on a revolving axle with a lifting-wheel continuously rotated by power applied from both wheels when the rake is advancing, substantially as described.

6. In a horse hay-rake, the combination of an independent rigid rake-head mounted on a revolving axle, a lifting-wheel continuously rotating by power applied from both wheels when the rake is advancing, and a device connected to the rake-head, which, at the will of the operator, can be thrown into gear with the lifting device for the purpose of discharging the gathered hay from the rake-teeth, substantially as described.

7. In a horse hay-rake, the combination of a revolving axle, a lifting-wheel thereon, a rigid rake-head oscillating on the axle as its center of motion, rake-teeth on the head and separate from the revolving axle, and mechanism for locking the axle and head together, substantially as described.

8. The combination, substantially as hereinbefore set forth, of a draft-frame, a revolving axle, driving-wheels thereon, a backing-ratchet interposed between each wheel and the axle, a rigid rake-head hung in bearings on the axle, teeth on the head, and mechanism on the axle for causing the teeth to discharge their load.

9. The combination of a draft-frame, a revolving axle rotated by means of a ratchet in each driving-wheel, a rake-frame free to rise and fall behind said axle and oscillate thereon as its center of motion, and mechanism for causing the motion of the axle to be imparted to the rake-head, the axle and head retaining the same relative position during the raising and dropping of the rake-teeth, substantially as described.

FREDERICK E. NEARING.

Witnesses:
WM. W. DIAMOND,
W. H. COLBERT.

Correction of Reissued Letters Patent No. 9,540.

It is hereby certified that in Reissued Letters Patent No. 9,540 granted January 25, 1881, to Charles La Dow, assignee of Frederick E. Nearing, for improvement in Horse Rakes and Hay Spreaders, the word "axle," in line 61, page 1, of the printed specification forming a part thereof, was erroneously printed "axles," also that errors occur in lines 41, 43, and 44, on page 2 of said printed specification requiring corrections as follows: in line 41, before the word "said," and in line 43, after the word "rotating," insert parentheses. In line 44 strike out the period after reference letter E and insert a comma. Strike out the capital S in the word "said" and substitute a small "s," and make the sentence continuous, so that the three lines will read as follows: "Used as a rake (said lever performs the function hereinbefore described—*i. e.*, preventing the head from rotating) and throwing the clutch F into gear with the wheel E, said wheel is;" that the proper corrections have been made in the files and records of the Patent Office, and are hereby made in said Letters Patent.

Signed, countersigned, and sealed this 4th day of February, A. D. 1881.

[SEAL.]

A. BELL,
*Acting Secretary of the Interior.*

Countersigned:

E. M. MARBLE,
*Commissioner of Patents.*